United States Patent
Guo et al.

(10) Patent No.: US 10,250,579 B2
(45) Date of Patent: Apr. 2, 2019

(54) SECURE FILE TRANSFERS WITHIN NETWORK-BASED STORAGE

(71) Applicant: Alcatel-Lucent USA Inc., Murray Hill, NJ (US)

(72) Inventors: Katherine H. Guo, Scotch Plains, NJ (US); Emina Soljanin, Green Village, NJ (US); Thomas Woo, Short Hills, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 546 days.

(21) Appl. No.: 13/965,809

(22) Filed: Aug. 13, 2013

(65) Prior Publication Data
US 2015/0052593 A1  Feb. 19, 2015

(51) Int. Cl.
*H04L 29/06* (2006.01)

(52) U.S. Cl.
CPC .............. *H04L 63/08* (2013.01); *H04L 63/10* (2013.01); *H04L 63/168* (2013.01)

(58) Field of Classification Search
CPC ....... H04L 63/08; H04L 63/10; H04L 63/168; H04L 29/08549; H04L 67/1097; G06F 21/6218; G06F 21/6209; G06F 2221/2103; G06F 17/30; G06F 17/30091; G06F 17/30097; G06F 17/301; G06F 3/0646; G06F 3/0655; G06F 21/64; G06F 3/067;
(Continued)

(56) References Cited

U.S. PATENT DOCUMENTS

| 6,085,242 A * | 7/2000 | Chandra ........... G06F 17/30887 707/E17.115 |
| 6,192,407 B1 * | 2/2001 | Smith ................ G06F 17/3089 707/E17.116 |

(Continued)

FOREIGN PATENT DOCUMENTS

| JP | H1131127 A | 2/1999 |
| JP | 2003044381 A | 2/2003 |

(Continued)

OTHER PUBLICATIONS

International Search Report and Written Opinion of PCT/US2014/047399, dated Sep. 25, 2014, pp. 1-9.
(Continued)

*Primary Examiner* — Nelson Giddins
(74) *Attorney, Agent, or Firm* — Tong, Rea, Bentley & Kim, LLC

(57) ABSTRACT

A capability is provided for securely transferring a file within network-based storage. A capability is provided for securely transferring a user file of a user from a first server to a second server. The first server may be associated with a first service provider and the second server may be associated with a second service provider. The secure transfer of a user file from the first server to the second server may be performed based on a One-Click File Transfer capability in which only a single click by the user is needed in order for the user file to be transferred. The secure transfer of a user file from the first server to the second server may be performed based on a Zero-Click File Transfer capability in which the user file may be transferred without any interaction by the user.

20 Claims, 4 Drawing Sheets

US 10,250,579 B2
Page 2

(58) Field of Classification Search
CPC ............ G06F 17/30197; G06F 17/302; G06F 2212/263
See application file for complete search history.

(56) References Cited

U.S. PATENT DOCUMENTS

| | | | | | |
|---|---|---|---|---|---|
| 6,240,105 | B1* | 5/2001 | Zetts | ................ | H04N 21/23116 348/E5.008 |
| 6,324,581 | B1* | 11/2001 | Xu | .................... | G06F 17/30171 707/999.01 |
| 6,529,956 | B1* | 3/2003 | Smith | ................ | G06F 17/3089 707/E17.116 |
| 6,978,378 | B1* | 12/2005 | Koretz | ................ | G06F 3/0481 713/193 |
| 7,047,406 | B2* | 5/2006 | Schleicher | .......... | H04L 63/0823 713/168 |
| 7,266,513 | B2* | 9/2007 | Chalmers | ............... | G06Q 10/08 705/26.1 |
| 7,441,029 | B2* | 10/2008 | Kano | .................... | G06F 3/0622 707/999.202 |
| 7,596,570 | B1* | 9/2009 | Emigh | ................ | G06F 11/1453 |
| 7,761,500 | B1* | 7/2010 | Eckert | ................ | H04L 67/2814 709/203 |
| 7,769,890 | B2* | 8/2010 | Littlefield | ............. | G06F 17/302 370/229 |
| 7,975,047 | B2* | 7/2011 | Dongre | ............... | H04L 67/2814 709/223 |
| 8,046,392 | B2* | 10/2011 | Ueoka | .................... | G06F 3/0607 707/828 |
| 8,260,881 | B1* | 9/2012 | Paleja | ...................... | G06F 8/60 709/217 |
| 8,670,449 | B2* | 3/2014 | Xue | ................ | H04L 29/12188 254/351 |
| 8,799,309 | B2* | 8/2014 | Kolathaya | ............ | H04W 12/06 707/769 |
| 8,832,850 | B2* | 9/2014 | Sotos | ...................... | H04L 69/14 370/328 |
| 8,918,603 | B1* | 12/2014 | Arous | .................... | G06F 17/00 711/161 |
| 9,009,111 | B2* | 4/2015 | Vermeulen | ........ | G06F 17/30212 707/626 |
| 9,392,075 | B1* | 7/2016 | Radovnikovic | ......... | G06F 21/31 |
| 9,407,686 | B2* | 8/2016 | Runstedler | .............. | H04W 4/08 |
| 9,794,321 | B2* | 10/2017 | Trifa | ................... | H04L 67/2814 |
| 2002/0010757 | A1* | 1/2002 | Granik | ................ | G06F 17/30876 709/218 |
| 2002/0013833 | A1* | 1/2002 | Wyatt | ...................... | G06F 8/656 709/220 |
| 2002/0049853 | A1* | 4/2002 | Chu | ........................ | H04L 29/06 709/237 |
| 2002/0055966 | A1* | 5/2002 | Border | ............... | G06F 17/30902 709/200 |
| 2002/0083036 | A1* | 6/2002 | Price | .................... | G06F 11/2028 |
| 2002/0147929 | A1* | 10/2002 | Rose | ...................... | G06F 21/335 726/10 |
| 2002/0194314 | A1* | 12/2002 | Kouznetsov | .............. | G06F 8/00 709/220 |
| 2003/0097399 | A1* | 5/2003 | Yuan | ...................... | G06Q 10/10 709/203 |
| 2003/0122922 | A1* | 7/2003 | Saffer | ............... | H04L 29/06027 348/14.01 |
| 2003/0217119 | A1* | 11/2003 | Raman | ................ | H04L 67/1095 709/219 |
| 2003/0229705 | A1* | 12/2003 | Yohichiroh | ....... | G06F 17/30011 709/229 |
| 2003/0229764 | A1* | 12/2003 | Ohno | ...................... | G06F 3/061 711/147 |
| 2003/0233329 | A1* | 12/2003 | Laraki | ................ | G06Q 20/123 705/52 |
| 2004/0133654 | A1* | 7/2004 | Caire | ................ | H04M 3/42008 709/218 |
| 2005/0078824 | A1* | 4/2005 | Malinen | .................. | H04L 63/08 380/247 |
| 2006/0168221 | A1* | 7/2006 | Juhls | ...................... | H04L 63/08 709/225 |
| 2007/0050630 | A1* | 3/2007 | Kumar | .................... | H04L 63/08 713/182 |
| 2007/0055674 | A1* | 3/2007 | Sunada | .............. | G06F 17/30011 |
| 2007/0143604 | A1* | 6/2007 | Arroyo | ............... | G06F 21/6218 713/167 |
| 2007/0263259 | A1* | 11/2007 | Yoshimura | .............. | H04L 51/08 358/402 |
| 2008/0066086 | A1* | 3/2008 | Whatmough | ...... | G06F 17/30905 719/322 |
| 2008/0095373 | A1* | 4/2008 | Nagata | .................... | H04L 63/10 380/278 |
| 2008/0195712 | A1* | 8/2008 | Lin | ...................... | G06F 3/0486 709/206 |
| 2008/0229211 | A1* | 9/2008 | Herberger | ............... | H04L 63/10 715/744 |
| 2009/0028137 | A1* | 1/2009 | Croak | ................. | H04M 3/4931 370/352 |
| 2009/0030975 | A1* | 1/2009 | Gupta | ...................... | H04L 63/08 709/203 |
| 2009/0083646 | A1* | 3/2009 | Lin | .................... | G06F 17/30905 715/769 |
| 2009/0271620 | A1* | 10/2009 | Sudhakar | ............ | H04L 63/0823 713/164 |
| 2009/0287937 | A1* | 11/2009 | Burden | .................. | H04L 9/3271 713/185 |
| 2010/0011416 | A1* | 1/2010 | Wagner | .................... | G06F 21/31 726/4 |
| 2010/0070759 | A1* | 3/2010 | Leon Cobos | ........... | G06F 21/43 713/155 |
| 2010/0094996 | A1* | 4/2010 | Samaha | ...................... | G06Q 10/10 709/224 |
| 2010/0125735 | A1* | 5/2010 | Zapata | ...................... | G06F 8/65 713/170 |
| 2010/0154038 | A1* | 6/2010 | Natarajan | ............... | H04L 63/08 726/5 |
| 2010/0161561 | A1* | 6/2010 | Moore | ............. | G06F 17/30091 707/661 |
| 2010/0223359 | A1* | 9/2010 | Runstedler | .............. | H04W 4/08 709/219 |
| 2010/0228989 | A1* | 9/2010 | Neystadt | ................... | G06F 21/10 713/185 |
| 2010/0235901 | A1* | 9/2010 | Simpkins | ............ | H04L 63/0281 726/12 |
| 2010/0250867 | A1* | 9/2010 | Bettger | ............. | G06F 17/30587 711/152 |
| 2010/0274859 | A1* | 10/2010 | Bucuk | .................... | H04L 63/08 709/206 |
| 2010/0318611 | A1* | 12/2010 | Curtin | .................... | G06F 15/16 709/206 |
| 2010/0332401 | A1* | 12/2010 | Prahlad | ............ | G06F 17/30082 705/80 |
| 2011/0029786 | A1* | 2/2011 | Raffard | ................ | H04L 63/10 713/193 |
| 2011/0131408 | A1* | 6/2011 | Cook | ................ | G06F 21/6218 713/153 |
| 2011/0145273 | A1* | 6/2011 | Kolathaya | ............... | H04L 63/08 707/769 |
| 2011/0145687 | A1* | 6/2011 | Grigsby | ............ | G06F 17/30884 715/206 |
| 2011/0202756 | A1* | 8/2011 | West | ...................... | H04L 51/08 713/152 |
| 2011/0295719 | A1* | 12/2011 | Chen | .................... | G06Q 30/02 705/27.1 |
| 2011/0321138 | A1* | 12/2011 | Kruger | .................... | G06F 21/31 726/4 |
| 2012/0030774 | A1* | 2/2012 | Keith | ................ | H04L 63/0428 726/30 |
| 2012/0066179 | A1* | 3/2012 | Saika | .................... | G06F 3/061 707/634 |
| 2012/0079389 | A1* | 3/2012 | Tsao | .................... | H04L 41/0806 715/736 |
| 2012/0102080 | A1* | 4/2012 | Kirihata | ................ | G06F 21/604 707/831 |

(56) References Cited

U.S. PATENT DOCUMENTS

| | | | |
|---|---|---|---|
| 2012/0131647 A1* | 5/2012 | Lan | H04L 63/0407 726/4 |
| 2012/0136926 A1* | 5/2012 | Dillon | G06F 17/30902 709/203 |
| 2012/0179905 A1* | 7/2012 | Ackerly | G06F 21/6218 713/155 |
| 2012/0284424 A1* | 11/2012 | Padia | H04L 67/1097 709/238 |
| 2012/0290842 A1* | 11/2012 | Artishdad | H04L 63/0428 713/168 |
| 2012/0309352 A1* | 12/2012 | Fang | H04L 63/08 455/411 |
| 2012/0320916 A1* | 12/2012 | Sebastian | H04N 21/2402 370/390 |
| 2012/0324242 A1* | 12/2012 | Kirsch | G06Q 20/0855 713/189 |
| 2012/0331108 A1* | 12/2012 | Ferdowsi | H04L 67/06 709/219 |
| 2013/0073423 A1* | 3/2013 | Allen | G06Q 30/02 705/26.8 |
| 2013/0117337 A1* | 5/2013 | Dunham | G06F 17/30194 707/827 |
| 2013/0173482 A1* | 7/2013 | Twining | G06Q 50/188 705/310 |
| 2013/0173484 A1* | 7/2013 | Wesby | G06Q 30/06 705/318 |
| 2013/0173915 A1* | 7/2013 | Haulund | H04L 9/3226 713/159 |
| 2013/0219176 A1* | 8/2013 | Akella | H04L 63/0815 713/165 |
| 2013/0227703 A1* | 8/2013 | Sotos | H04L 69/14 726/26 |
| 2014/0012990 A1* | 1/2014 | Ko | H04L 63/168 709/226 |
| 2014/0040617 A1* | 2/2014 | Fernandez de Torres | H04L 63/08 713/168 |
| 2014/0053227 A1* | 2/2014 | Ruppin | G06F 21/10 726/1 |
| 2014/0067865 A1* | 3/2014 | Kirigin | H04L 63/10 707/783 |
| 2014/0068746 A1* | 3/2014 | Gonzalez Martinez | H04L 63/0884 726/9 |
| 2014/0090030 A1* | 3/2014 | Ong | G06F 17/30867 726/4 |
| 2014/0108486 A1* | 4/2014 | Borzycki | G06F 21/6218 709/201 |
| 2014/0115329 A1* | 4/2014 | Sturonas | H04L 63/1466 713/165 |
| 2014/0129675 A1* | 5/2014 | Pang | H04L 67/06 709/217 |
| 2014/0136807 A1* | 5/2014 | Brown | G06F 3/06 711/164 |
| 2014/0165156 A1* | 6/2014 | Fushman | H04L 65/1083 726/4 |
| 2014/0181187 A1* | 6/2014 | Stevens | H04L 67/322 709/203 |
| 2014/0208420 A1* | 7/2014 | Mraz | H04L 63/1408 726/22 |
| 2014/0215210 A1* | 7/2014 | Wang | G06F 21/6209 713/165 |
| 2014/0219175 A1* | 8/2014 | Nakamura | H04L 65/1046 370/328 |
| 2014/0223574 A1* | 8/2014 | Margalit | H04L 63/10 726/27 |
| 2014/0280755 A1* | 9/2014 | Memon | H04L 67/02 709/219 |
| 2014/0337407 A1* | 11/2014 | Mraz | H04L 67/42 709/203 |
| 2014/0351907 A1* | 11/2014 | Noble | H04L 63/08 726/6 |
| 2015/0007264 A1* | 1/2015 | Maldaner | H04L 67/1097 726/3 |
| 2015/0020164 A1* | 1/2015 | Tankov | H04L 63/08 726/4 |
| 2015/0049900 A1* | 2/2015 | Kamitani | G06Q 30/02 382/100 |
| 2015/0135300 A1* | 5/2015 | Ford | H04L 67/1097 726/11 |
| 2015/0149574 A1* | 5/2015 | Shimomoto | G06F 17/30067 709/206 |
| 2015/0169203 A1* | 6/2015 | Noolu | H04M 3/541 715/748 |
| 2015/0186182 A1* | 7/2015 | Kojima | G06Q 10/06 718/103 |
| 2015/0188889 A1* | 7/2015 | Lawson | H04L 63/0272 726/15 |
| 2015/0234929 A1* | 8/2015 | Goyal | G06F 17/30879 235/375 |
| 2015/0304491 A1* | 10/2015 | Gindi | H04M 3/42051 455/415 |
| 2015/0347782 A1* | 12/2015 | Sturonas | H04L 63/1466 713/165 |
| 2015/0381536 A1* | 12/2015 | Ptitsyn | H04L 51/38 709/206 |
| 2015/0381588 A1* | 12/2015 | Huang | H04L 63/0435 713/153 |
| 2016/0065548 A1* | 3/2016 | Brouwer | H04L 63/061 713/171 |
| 2016/0100016 A1* | 4/2016 | Mu | H04L 63/10 709/219 |
| 2016/0267290 A1* | 9/2016 | Gan | H04L 63/08 |

FOREIGN PATENT DOCUMENTS

| | | |
|---|---|---|
| JP | 2004005189 A | 1/2004 |
| JP | 2008104030 A | 5/2008 |

OTHER PUBLICATIONS

Menezes et al., "Handbook of Applied Cryptography", XP55141026, Retrieved from Internet: URL:http//cacr.uwaterloo.ca/hac, retrieved Sep. 17, 2014, total pp. 21,( pp. 397-404, pp. 546-550, pp. 556-558, pp. 572-575).

ReadWrite, "How to Move Your Facebook Photos to Picasa & Google Plus," http://readwrite.com/2011/07/12/move_your_facebook_photos_to_picasa_share_with_google_plus. printed on Aug. 13, 2013.

Inside Facebook, "How to Sync Your Twitter and Facebook Status Updates," http://www.insidefacebook.com/2009/01/22/how-to-sync-your-twitter-and-facebook-status-updates/, printed on Jun. 6, 2013.

* cited by examiner

SECURE FILE TRANSFERS WITHIN NETWORK-BASED STORAGE

TECHNICAL FIELD

The disclosure relates generally to communication networks and, more specifically but not exclusively, to secure transfers of files within network-based storage.

BACKGROUND

Personal cloud storage services enable end users to access data using any device at any location. There are many ways for an end user to transfer files to a personal cloud storage of the end user, the most common being for the end user to transfer files from devices of the end user to personal cloud storage servers operated by the personal cloud storage service provider that is providing the personal cloud storage service. While this approach may be sufficient for existing files that are stored on the devices of the end user, this approach is inefficient for files not stored on the device of the end user (e.g., files stored on servers of other service providers, files located on other end user devices, and the like).

SUMMARY OF EMBODIMENTS

Various deficiencies in the prior art are addressed by embodiments for securely transferring a file within network-based storage.

In at least some embodiments, an apparatus includes a processor and a memory communicatively connected to the processor, where the processor is configured to generate an announcement message including a link specifying a file location and a file name of a user file stored on the apparatus for a user, propagate the announcement message for delivery to the user, receive from a server a request to establish a secure connection between the server and the apparatus, receive from the server a request for the user file stored on the apparatus for the user where request includes the link, and propagate the user file toward the server via the secure connection.

In at least some embodiments, an apparatus includes a processor and a memory communicatively connected to the processor, where the processor is configured to receive an announcement message including a link specifying a file location and a file name of a user file stored on a first server for a user, and determine, based on at least one characteristic of the link, whether to initiate a connection with the first server based on the link or to propagate the link toward a second server.

In at least some embodiments, an apparatus includes a processor and a memory communicatively connected to the processor, where the processor is configured to receive, from a user device, a message including a link specifying a file location and a file name of a user file stored on a server for a user, initiate establishment of a secure connection with the server, and propagate a request for the user file toward the server based on the link.

BRIEF DESCRIPTION OF THE DRAWINGS

The teachings herein can be readily understood by considering the detailed description in conjunction with the accompanying drawings, in which.

To facilitate understanding, identical reference numerals have been used, where possible, to designate identical elements common to the figures.

DETAILED DESCRIPTION OF EMBODIMENTS

A secure file transfer capability is presented herein. In at least some embodiments, the secure file transfer capability supports secure transfer of a file within network-based storage. In at least some embodiments, the secure file transfer capability supports secure transfer of a file from a first server of a first service provider to a second server of a second service provider. In at least some embodiments, the secure file transfer capability supports secure transfer of a user file generated by a first service provider for a user to a personal network storage of the user that is provided by a second service provider. In at least some embodiments, secure transfer of a user file of a user from the first server of the first service provider to the second server of the second service provider may be effected with only a single click by the user via a user device of the user (also referred to herein as a One-Click File Transfer capability). In at least some embodiments, secure transfer of a file of a user from the first server of the first service provider to the second server of the second service provider may be effected without any click by the user via a user device of the user (also referred to herein as a Zero-Click File Transfer capability). It is noted that such embodiments do not require downloading of the user file to a user device of the user in order to transfer the user file from the first server to the second server and, thus, provide various advantages to the service providers and to the user. These and various other embodiments of the secure file transfer capability may be better understood by way of reference to an exemplary communication system configured to support secure transfers of files of a user to a personal network storage of the user as depicted in FIG. 1.

Figure 1:
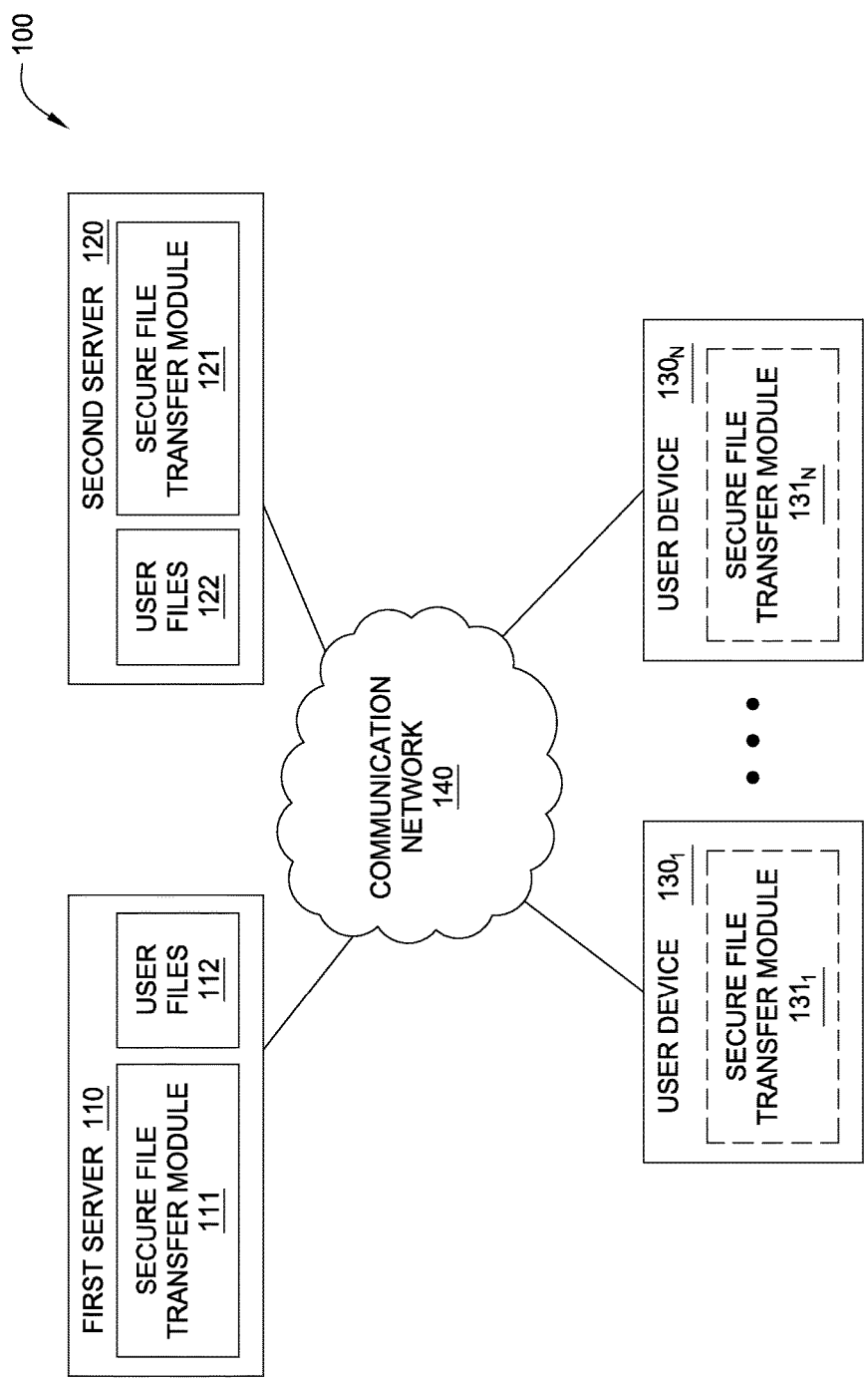
FIG. 1 depicts an exemplary communication system configured to support secure transfers of files to personal network storage.

FIG. 1 depicts an exemplary communication system configured to support secure transfers of files to personal network storage. As depicted in FIG. 1, communication system 100 includes a first server (FS) 110, a second server (SS) 120, a set of user device (UDs) 130$_1$-130$_N$ (collectively, UDs 130) of a user, and a communication network (CN) 140. The FS 110, SS 120, and UD 130 communicate via CN 140.

The FS 110 and the SS 120 are servers configured to provide functions typically provided by servers accessible via a communication network such as CN 140, as will be understood by one skilled in the art. For example, FS 110 and SS 120 may be configured to store user files, respond to requests to operate on user files (e.g., examine, manipulate, transfer, or the like), and the like. For example, the user files may include text files, image files, audio files, video files, multimedia files, or the like, as well as various combinations thereof. It will be appreciated that examination of the user files may depend on the content types of the user files (e.g., viewing user files including text or images, playing back user files includes audio or video, or the like). In FIG. 1, user files are depicted as user files 112 on FS 110 and user files 122 on SS 120.

The FS 110 is operated by a first service provider and the SS 120 is operated by a second service provider. For purposes of clarity in describing embodiments of the secure file transfer capability, it is generally assumed that the first service provider is a service provider that generates or stores user files for the user of UDs 130 (e.g., a telecommunications service provider generating bills for the user, a utility company generating bills for the user, a bank generating bank statements for the user, an email provider storing email attachments associated with a user account of the user on email server, or the like), and that the second service provider is a service provider that provides network-based storage and management of user files for the user of UD 130 (e.g., a cloud service provider providing a personal cloud storage service for the user of UDs 130, or other similar type of service provider providing a personal network-based storage service for the user of UDs 130).

The FS 110 and SS 120 support independent authentication schemes for accessing files. It will be appreciated that the authentication schemes used by the user to access user files on FS 110 and SS 120 may be the same (e.g., using a login and password combination, using a challenge/response combination, or the like), and even at least a portion of the authentication information used by the user to access user files on FS 110 and SS 120 may be the same (e.g., in many cases, users use the same login and password combinations for multiple accounts), but that authentication by the user to FS 110 is independent of authentication by the user to SS 120. Thus, it will be appreciated that the authentication schemes of FS 110 and SS 120 may be independent in the sense that, even when the authentication schemes of FS 110 and SS 120 and authentication information used by the user for FS 110 and SS 120 are identical, providing such authentication information to FS 110 does not enable the user to access user files on SS 120 and, similarly, providing such authentication information to SS 120 does not enable the user to access user files on FS 110.

The FS 110 and SS 120 each may be configured to support secure connections. The FS 110 and SS 120 each may be configured to operate as a secure server and a secure client. As a result, any third party devices supporting the same security protocol as FS 110 and SS 120 (e.g., ones of the UDs 130 or any other devices) can establish a secure connection with FS 110 and SS 120 and, similarly, that FS 110 and SS 120 can establish a secure connection between each other. The secure connections may be provided using any suitable security protocol or mechanism, such as Secure Socket Layer (SSL), File Transfer Protocol Secure (FTPS), Secure File Transfer Protocol (SFTP), Hypertext Transfer Protocol Secure (HTTPS), or the like.

The UDs 130 may include any user devices of the user via which the user may access (and, optionally, operate on) user files stored on servers in a network. For example, the UDs 130 may include one or more of a desktop computer, a laptop computer, a tablet computer, a smartphone, or the like. It will be appreciated that, although depicted and described with respect to a set UDs 130, various functions depicted and described herein may be performed where the user has or uses only a single UD 130.

The CN 140 may include any communication network(s) suitable for supporting communications between FS 110, SS 120, and UDs 130 (e.g., access networks, core networks, wireline networks, wireless networks, the Internet, or the like, as well as various combinations thereof).

In general, user files served by a personal cloud storage service, such as a personal cloud storage service provided by SS 120, may be categorized into at least three categories (one or more of which may have one or more associated sub-categories) as follows:

(a) user files already stored on UDs 130 before the user signed up for the personal cloud storage service of SS 120 (e.g., existing MP3 songs on one or more UDs 130) and user files generated by UDs 130 after the user signed up for the personal cloud storage service of SS 120 (e.g., pictures taken on one or more UDs 130);

(b) user files obtained from servers sharing the same authentication mechanism as SS 120, such as where the first and second service providers of FS 110 and SS 120 are the same (e.g., MP3 songs purchased on AMAZON when the user has already registered for the AMAZON cloud storage service known as AMAZON S3); and (c) user files obtained from other devices or servers (e.g., FS 110) after the user has signed up for the personal cloud storage service of SS 120 where the other devices or servers have an authentication scheme(s) different than the authentication scheme of personal cloud storage service provided on SS 120.

For user files in category (a), transfer of the user files to SS 120, for storage in the personal cloud storage of the user that is provided by the cloud storage service provider of SS 120, may follow a traditional data transfer model for transfer of data between UDs 130 and SS 120 through user authentication with SS 120.

For user files in category (b), transfer of the user files from FS 110 to SS 120, for storage in the personal cloud storage of the user that is provided by the service provider of FS 110 and SS 120, may follow a traditional data transfer model for transfer of data between servers of the same service provider (e.g., upon purchasing an mp3 song via AMAZON, AMAZON gives the user choices of downloading the MP3 to the UD 130 being used to purchase the MP3 or transferring the MP3 to the personal cloud storage provided for the user via AMAZON S3).

For user files in category (c), however, the user typically has no choice but to download the user files from FS 110 to one or more of the UDs 130 and then upload the user files from the UD(s) 130 to SS 120. In terms of impact to the user, this model of transfer is adequate if the user examines the user files before storing the user files in the personal cloud storage. However, many users do not want to examine such user files (e.g., utility statements, bank statement, and the like), but, rather, simply want to store such user files in their personal cloud storages for archival purposes. Furthermore, as indicated above, this model of file transfer requires two network hops (from FS 110 to UD 130 and from UD 130 to SS 120), which consumes valuable resources of CN 140 and delays transfer of the user file into the personal cloud storage of the user.

In at least some embodiments, a secure file transfer capability is supported for enabling secure transfer of a user file from FS 110 to SS 120 directly (rather than via a UD 130 of the user) even though the user relies upon independent authentication schemes to access FS 110 and SS 120. Various embodiments of the secure file transfer capability include a One-Click File Transfer capability (depicted and described with respect to FIG. 2), a Zero-Click File Transfer capability (depicted and described with respect to FIG. 3), and the like.

The FS 110 and SS 120 (and, optionally, one or more of the UDs 130) are each configured to support embodiments of the secure file transfer capability. The FS 110 includes a secure file transfer module 111 configured to support one or more of a One-Click File Transfer capability, a Zero-Click File Transfer Capability, or the like, as well as various combinations thereof. Similarly, the SS 120 includes a secure file transfer module 121 configured to support one or more of a One-Click File Transfer capability, a Zero-Click File Transfer Capability, or the like, as well as various combinations thereof. Additionally, in at least some embodiments, one or more of the UDs 130 may include a secure file transfer module 131 configured to support a One-Click File Transfer capability (where it is noted that the Zero-Click File Transfer Capability does not require any processing at the UDs 130).

Figure 2:
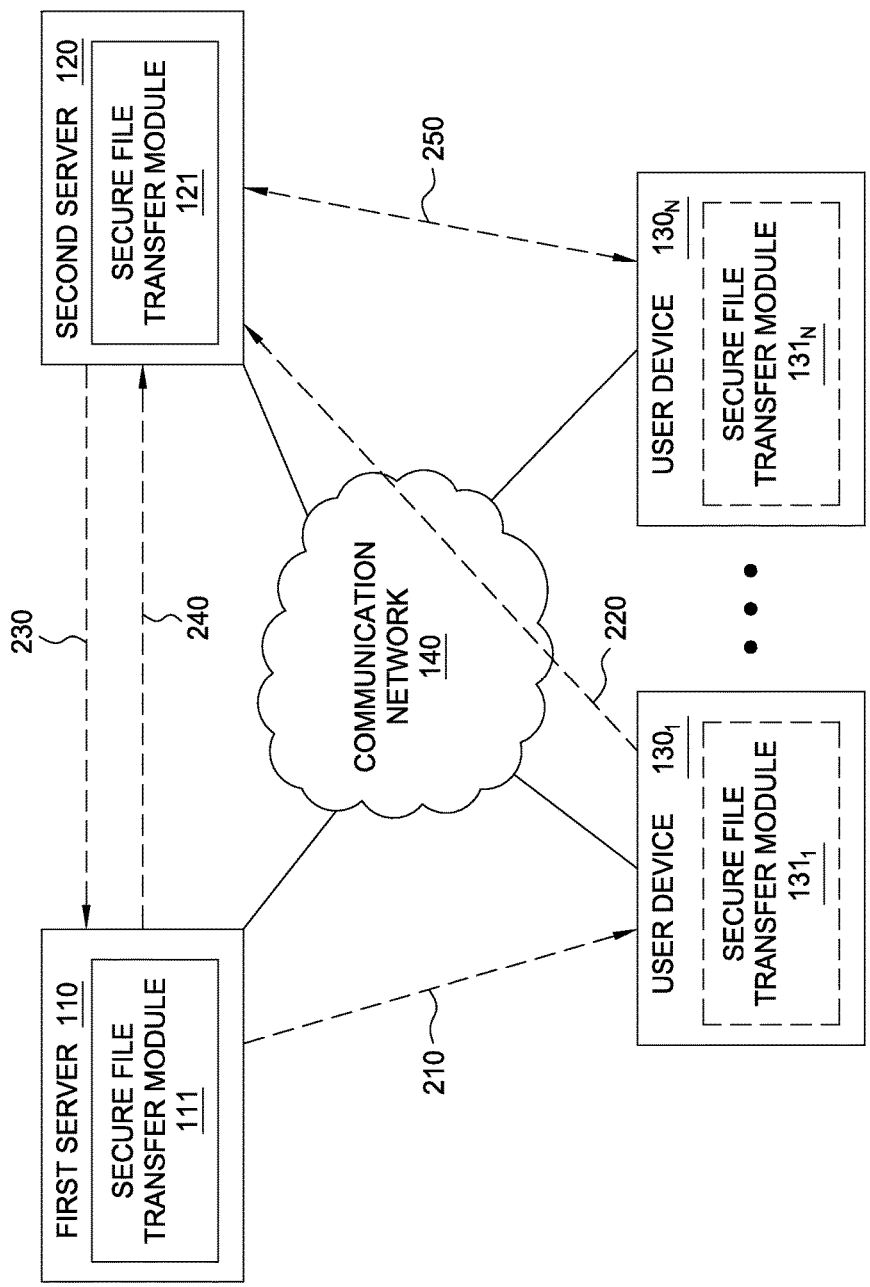
FIG. 2 depicts an exemplary embodiment of a One-Click File Transfer capability.

FIG. 2 depicts an exemplary embodiment of a One-Click File Transfer capability. In the One-Click File Transfer capability, based on detection of one or more triggering events, SS 120 pulls a user file from FS 110 in a secure manner (e.g., using one or more security mechanisms).

It will be appreciated that, although embodiments of the One-Click File Transfer capability are depicted within the context of message flows within the context of the communication system 100 of FIG. 1, the various functions described as being performed by elements of the communication system 100 of FIG. 1 may be implemented as corresponding methods on the respective elements of the communication system 100 of FIG. 1.

At step 210, FS 110 sends an announcement message to the user to inform the user that a user file is available for the user on FS 110.

The announcement message may be sent when FS 110 generates the user file, when the FS 110 receives the user file from another device, based on a determination by FS 110 that the user is to be informed about availability of the user file, or the like. For example, communications service providers, utility companies, banks, and other entities typically send periodic (e.g., monthly, bi-monthly, or the like) announcement messages to users to indicate that statements or bills are available for examination by the users.

The announcement message may be sent as an email message to an email account of the user, a message to a mobile device of the user (e.g., a Short Message Service (SMS) message, a Multimedia Message Service (MMS) message, or the like), an instant message to an instant message account of the user, or the like. It will be appreciated that multiple such announcement messages may be sent via different media (e.g., the user may wish to be informed of availability of the user file via both email and text messages).

The announcement message includes a link specifying the identity and location of the user file on FS 110. The link may be included within the body of the announcement message, within an attachment included with the announcement message (e.g., in a MICROSOFT WORD document, in Portable Document Format (PDF) file, or the like), or the like. The link may be specified as a Uniform Resource Locator (URL), or using any other suitable mechanism for indicating the identity and location of the user file on FS 110. For example, the link may be specified as https://hostname-of-serverFS110/path-name-to-user-file/user-file-name.

The link is configured by FS 110 to have one or more characteristics which may be used by a UD 130 of the user to identify the link as one for which the One-Click File Transfer procedure is to be performed (as opposed to other links for which clicking of the links is expect to result in invocation of a web browser on the UD 130 of the user). In at least some embodiments, the specification in the link of the identity and location of the user file on FS 110 may be sufficient to enable the UD 130 of the user to identify the link as one for which the One-Click File Transfer procedure is to be performed, such that no additional configuration of the link with an additional characteristic(s) is expected to be needed (although, as discussed below, such additional configuration still could be provided). In at least some embodiments, the link may be configured to have one or more characteristics (other than specification in the link of the identity and location of the user file on FS 110). For example, the link may be configured to have a length greater than a threshold (which may be strongly indicative, but not necessarily dispositive, that the link is one for which the One-Click File Transfer process is to be performed), may be configured to include specific text which is expected to be unique for purposes of identifying the link as one for which the One-Click File Transfer process is to be performed, or the like, as well as various combinations thereof. As indicated above, such other characteristics may be used in conjunction with or in place of specification in the link of the identity and location of the user file on FS 110 in order to enable the UD 130 of the user to identify the link as one for which the One-Click File Transfer procedure is to be performed. The use of one or more characteristics which may be used by a UD 130 of the user to identify the link as one for which the One-Click File Transfer procedure is to be performed enables the UD 130 to distinguish such links from other links for which the One-Click File Transfer procedure is not to be performed, thereby enabling the user to continue to use the UD 130 to click on various other links without invoking the One-Click File Transfer procedure.

The link may be configured by FS 110 in a manner for preventing patterns in links generated by FS 110 for the user over time. This may be used to prevent patterns associated with the user, patterns associated with the user file, or the like, as well as various combinations thereof. This is expected to make it difficult for anyone except the user to guess the information of the link, thereby preventing any malicious entities from accessing the user file from FS 110.

The link may be configured by FS 110 in a manner for encoding a property of the user within the link such that the property of the user may be recovered from the link (e.g., by applying a hash function to at least a portion of the link or in any other suitable manner for recovering such information). The property of the user may include the zip code of the billing address of the user, the last four digits of the Social Security Number (SSN) of the user, part of a telephone number of the user, a PIN composed of a set of characters (e.g., three letters, four digits, five alphanumeric characters, or the like) specified for the user, or the like. The property of the user may be encoded within the path-name-to-user-file portion of the link, within the user-file-name portion of the link, within the path-name-to-user-file/user-file-name portion of the link, or the like. The encoding of information (e.g., the property of the user) within a string (e.g., the link) will be understood by one skilled in the art. The FS 110 is configured to execute a challenge-response process with any entity requesting the user file using the link when the entity has not gone through the typical authentication scheme (e.g., username and password) for accessing the user file. In other words, FS 110 is configured to execute the challenge-response process with SS 120 (or any other entity that obtained the link, legitimately or illegitimately, but which is not attempting to access the user file through the typical authentication scheme), but not with any of the UDs 130 for which the typical authentication scheme will be used to access the user file. It also will be appreciated that FS 110 may be configured to execute a challenge-response process for securing access to the user file from FS 110 based on a property of the user even when the property of the user is not encoded within the link, as discussed in additional detail below.

At step 220, UD 130 receives the announcement message including the link from FS 110, the user clicks the link in the announcement message via UD 130, UD 130 identifies the link in the announcement message as being a link for which the One-Click File Transfer process is to be invoked, and UD 130 propagates the link to SS 120 in a secure manner.

The UD 130 identifies the link in the announcement message as being a link for which the One-Click File Transfer process is to be invoked (as opposed to a link for which the One-Click File Transfer process is not to be invoked). Namely, the clicking of the link in the announcement message is not intended for the web browser (or any other client program) of the UD 130 to establish a secure connection between the UD 130 and FS 110; rather, clicking of the link in the announcement message is intended to invoke the One-Click File Transfer process such that SS 120 retrieves the user file from FS 110 directly without requiring that the user file be transferred via UD 130. As discussed hereinabove, the link is configured by FS 110 to have one or more characteristics which enable the UD 130 to identify the link as being a link that is intended to invoke the One-Click File Transfer process rather than a link that is not intended to invoke the One-Click File Transfer process. Accordingly, UD 130 is configured to check one or more characteristics of a link clicked via UD 130 in order to be able to distinguish between clicking of a link that is intended to invoke the One-Click File Transfer process and clicking of a link that is not intended to invoke the One-Click File Transfer process. In one embodiment, for example, UD 130 is configured to identify a link as being a link that is intended to invoke the One-Click File Transfer process based on a determination that (1) a particular secure connection protocol is specified in the link (e.g., HTTPS or one or more other suitable types of secure connection protocols), (2) the host name specified in the link matches the name of FS 110, and (3) the path name of the user file specified in the link exhibits one or more characteristics (e.g., length greater than a threshold, includes specific text, or the like). In one embodiment, for example, UD 130 is configured to identify a link as being a link that is intended to invoke the One-Click File Transfer process based on a determination that the link includes a specific string of text. It will be appreciated that FS 110 may be configured to configure the link according to any other suitable characteristic or set of characteristics and, similarly, that UD 130 may be configured to evaluate the link according to any other suitable characteristic or set of characteristics. It will be appreciated that FS 110 and UD 130 will agree on the characteristic or set of characteristics used in order to distinguish between clicking of a link that is intended to invoke the One-Click File Transfer process and clicking of a link that is not intended to invoke the One-Click File Transfer process (e.g., such characteristic or set of characteristics may be conveyed from FS 110 to UD 130 for this purpose).

The UD 130, based on identification of the link in the announcement message as being a link for which the One-Click File Transfer process is to be invoked, propagates the link to SS 120 in a secure manner. The UD 130 may establish a secure connection to SS 120 and propagate the link to SS 120 via the secure connection. The secure connection may be based on SSL, HTTPS, FTPS, SFTP, or the like. The UD 130 also may encrypt the link (or the message used to propagate the link) before sending the link to SS 120 in order to provide an additional level of security. It will be appreciated that, although primarily depicted and described with respect to embodiments in which the link is propagated from UD 130 to SS 120, in at least some embodiments only the relevant information from the link (e.g., identification of the location and identity of the user file on FS 110) may be propagated from UD 130 to SS 120. In any event, SS 120 receives information suitable for use by SS 120 in retrieving the user file from FS 110.

It will be appreciated that, although primarily depicted and described with respect to embodiments in which processing logic used by a UD 130 to distinguish links for which One-Click File Transfer is to be performed is specific to FS 110, in at least some embodiments processing logic used by a UD 130 to distinguish links for which One-Click File Transfer is to be performed may be configured to distinguish links for which One-Click File Transfer is to be performed for multiple servers of one service provider, for multiple servers of different service providers, or the like, as well as various combinations thereof.

At step 230, SS 120 receives the link from UD 130 and requests the user file from FS 110 based on the link received from UD 130.

The SS 120 initiates establishment of a secure connection with FS 110. The secure connection may be based on SSL, FTPS, SFTP, HTTPS, or the like. The SS 120 requests the user file from FS 110 via the secure connection using the link. In at least some embodiments, one or more additional layers of security may be provided in conjunction with retrieval of the user file by SS 120 from FS 110.

In at least some embodiments, FS 110 is configured to execute a challenge-response procedure in response to a request by an entity to retrieve the user file from FS 110 when the entity requesting to retrieve the user file is not using a typical authentication scheme (e.g., username and password) for accessing the user file. Here, the requesting entity is SS 120. The SS 120 sends the request for the user file to FS 110, which determines that the user file is to be protected by a challenge-response process. The FS 110 sends to SS 120 a challenge requesting that SS 120 respond to the challenge by providing a property of the user that FS 110 may use to verify that SS 120 is authorized to access the user file. The SS 120 receives the challenge from FS 110 and determines the property of the user that is requested by FS 110. The SS 120 sends a response to FS 110 that includes the property of the user that was requested by FS 110. The FS 110 then compares the property of the user that is received in the response from SS 120 with a corresponding property of the user that is determined by FS 110. If the values of the comparison match, FS 110 determines that SS 120 is authorized to retrieve the user file specified by the link; otherwise, if the values of the comparison do not match, FS 110 determines that SS 120 is not authorized to retrieve the user file specified by the link (in which case FS 110 may return an error message to SS 120 indicating that SS 120 is not authorized to retrieve the user file). It will be appreciated that the property of the user that is determined by SS 120 in response to the challenge and determined by FS 110 for comparison with the response from SS 120 may be determined by SS 120 and FS 110 in a number of ways.

In at least some embodiments for example, the property of the user is available to both FS 110 and SS 120. For example, the user may provide the same or similar sets of user specific information (including the same property of the user to be used for security purposes) to both the first service provider of FS 110 and the second service provider of SS 120. The property of the user may be stored on FS 110 and SS 120 or otherwise accessible to FS 110 and SS 120. The property of the user may be retrieved by SS 120 in response to the challenge from FS 110 and provided to SS 120 in the response, and the property of the user may be retrieved by FS 110 for comparison with the property of the user received from SS 120. The comparison performed by FS 110 may then proceed as discussed above.

In at least some embodiments, for example, as discussed above in conjunction with a description of properties of the link, the property of the user is encoded within the link. The FS 110 sends to SS 120 a challenge requesting the property of the user that is encoded within the link. The SS 120 receives the challenge from FS 110 and applies its hash function to the link in order to recover the property of the user from the link. The SS 120 sends a response to FS 110 that includes the property of the user that was recovered by SS 120 from the link. The FS 110 then applies its hash function to the encoded portion of the link received from SS 120 in order to recover the property of the user from the link. The comparison performed by FS 110 may then proceed as discussed above. It will be appreciated that the hash functions used by FS 110 (to recover the property of the user from the link) and SS 120 (to decode the property of the user from the link responsive to the challenge from FS 110) need to be the same in order for the challenge-response process to be successful. The hash function may be provided to FS 110 and SS 120 in any suitable manner. For example, the user may specify the same hash function during registration or account management functions performed by the user with the first service provider (for FS 110) and the second service provider (for SS 120). For example, the hash function used by FS 110 may be provided from FS 110 to SS 120, although it will be appreciated that the hash function typically should not be sent as part of the announcement message sent from FS 110 to UD 130 or in the link message sent from UD 130 to SS 120 or any malicious entity that obtains access to either of those messages could pretend to be SS 120 and gain access to the user file from FS 110 using the link and the hash function. It will be appreciated that use of a hash function to recover the property of the user may be useful in cases in which the user provides different sets of user specific information to the first service provider and the second service provider.

It will be appreciated that other types of security also may be applied to make the transfer of the user file from FS 110 to SS 120 more secure.

At step 240, FS 110 transfers the user file to SS 120 via the secure connection. The SS 120 receives the user file from FS 110 via the secure connection and stored the user file in the personal cloud storage of the user. The location at which the user file is stored on SS 120 may be determined by SS 120 and communicated to the user, or may be specified by the user. At this point, the user file now exists on both FS 110 and SS 120 without the user having to download the user file to any of the UDs 130 of the user.

At step 250, at any time after transfer of the user file from FS 110 to SS 120, the user may access the user file from SS 120 using existing procedures by which the user accesses files from his or her personal cloud storage (e.g., using password-based authentication provided via a secure connection such as HTTPS). The user also may manage the user file as may be done for any other files stored in the personal cloud storage of the user on SS 120 (e.g., actions such as examine, rename, download, transfer, delete, or the like). The user also may still access the user file from FS 110. In at least some embodiment, the user file may be encrypted on one or both of FS 110 and SS 120, such that anyone requesting to access the user file needs to provide a code (e.g., a PIN or some other information which may be used as a basis for protecting a file with encryption) in order to decrypt the user file.

In at least some embodiments of the One-Click File Transfer capability, security of the transfer of the user file from FS 110 to SS 120 may be provided based on encryption of the user file with a code having the following two components: (1) a first code part which varies across user files and is provided to the user in the announcement message notifying the user of the availability of the user file on SS 120, and (2) a second code part composed of or including a property of the user known to the user and FS 110 (e.g., the zip code of the billing address of the user that is on file with the service providers of FS 110, the last four digits of the SSN of the user, a portion of a telephone number of the user that has been provided to the service provider associated with FS 110 as a contact number for the user, a PIN composed of a set of characters specified for the user, or the like). This may be used to ensure that the user file on SS 120 may only be decrypted by a user who knows both the first code part and the second code part, thereby reducing the chance for a malicious user to be able to access the user file from SS 120.

Figure 3:
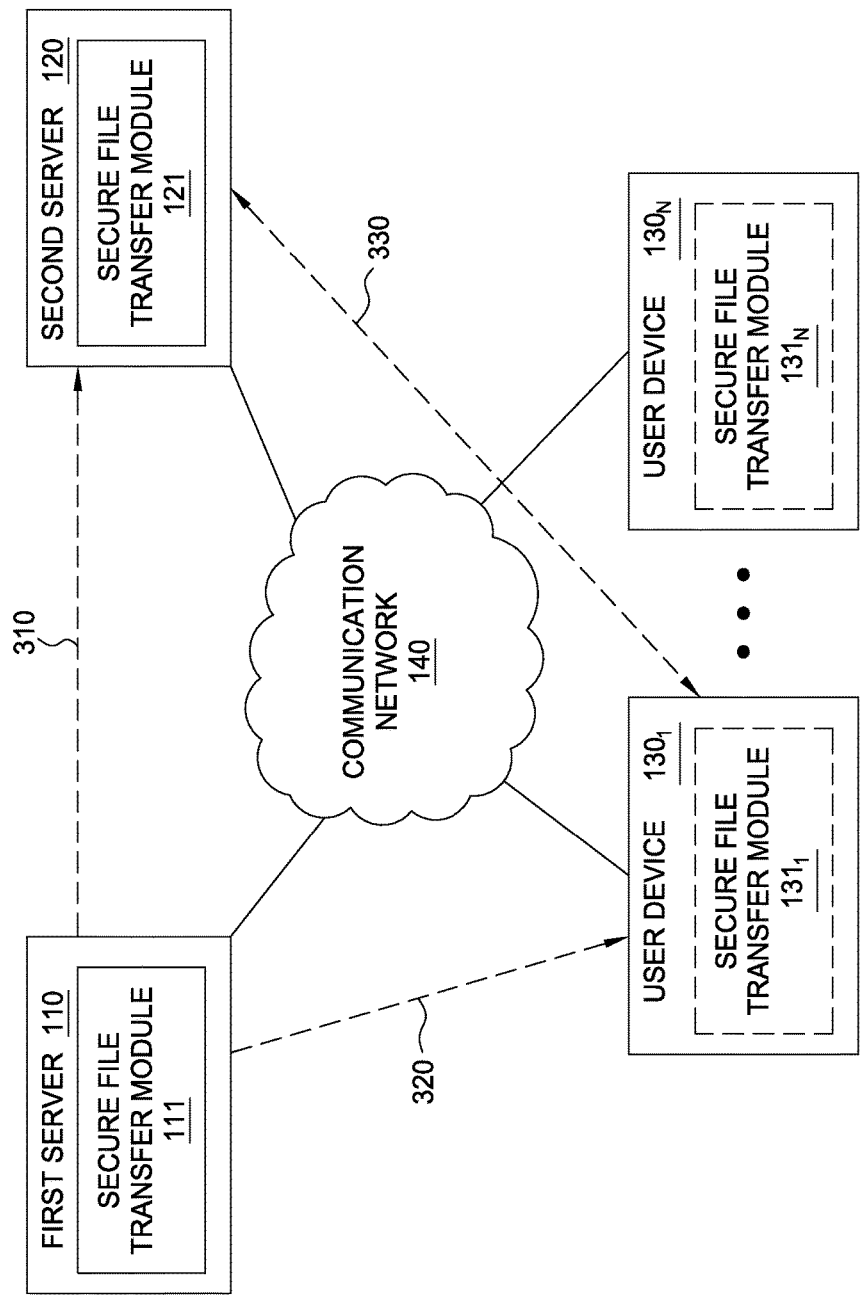
FIG. 3 depicts an exemplary embodiment of a Zero-Click File Transfer capability.

FIG. 3 depicts an exemplary embodiment of a Zero-Click File Transfer capability. In the Zero-Click File Transfer capability, based on detection of one or more triggering events, FS 110 pushes a user file to SS 120 in a secure manner (e.g., using one or more security mechanisms).

It will be appreciated that, although embodiments of the Zero-Click File Transfer capability are depicted within the context of message flows within the context of the communication system 100 of FIG. 1, the various functions described as being performed by elements of the communication system 100 of FIG. 1 may be implemented as corresponding methods on the respective elements of the communication system 100 of FIG. 1.

It is assumed that, before the Zero-Click File Transfer process begins, (1) the user allocates, on SS 120, a file directory into which FS 110 (and, optionally, one or more other authorized servers) may transfer user files of the user (2) the user informs FS 110 of the file directory allocated on SS 120 for use by FS 110. The file directory name of the file directory may have various properties associated therewith, as discussed below. The file directory name of the file directory may be in the form of "hostname-of-serverSS120/ path-name-to-user-file-incoming-directory", or in any other suitable form. The file directory name may be configured to have one or more characteristics tending to make the file directory name secure.

In at least some embodiments, the file directory name may be configured to have one or more characteristics that tend to make it difficult, if not impossible, for unauthorized communication endpoints (or their associated users) to guess the "path-name-to-user-file-incoming-directory" portion of the file directory name. For example, the characteristics may include one or more of making the file directory name relatively long (where a longer file directory name is expected to correlate to a more secure file directory name), including specific text within the file directory name, or the like, as well as various combinations thereof.

In at least some embodiments, the file directory name is configured in a manner for encoding a property of the user within the file directory name such that the property of the user may be recovered from the file directory name (e.g., by applying a hash function to at least a portion of the file directory name or in any other suitable manner for recovering such information). The property of the user may include the zip code of the billing address of the user, the last four digits of the Social Security Number (SSN) of the user, part of a telephone number of the user, a PIN composed of a set of characters (e.g., three letters, four digits, five alphanumeric characters, or the like) specified for the user, or the like. The property of the user may be encoded within the "path-name-to-user-file-incoming-directory" portion of the file directory name. The encoding of information (e.g., the property of the user) within a string (e.g., the file directory name) will be understood by one skilled in the art. The SS 120 is configured to execute a challenge-response process with any entity requesting to transfer a file(s) into the file directory specified by the file directory name when the entity has gone through the typical authentication scheme (e.g., username and password) for accessing the file directory. In other words, SS 120 is configured to execute the challenge-response process with FS 110 (or any other entity that obtained the file directory name, legitimately or illegitimately, but which is not attempting to access the file directory through the typical authentication scheme), but not with any of the UDs 130 for which the typical authentication scheme will be used to access the file directory. It also will be appreciated that SS 120 may be configured to execute a challenge-response process for securing access to the file directory from SS 120 based on a property of the user even when the property of the user is not encoded within the file directory name, as discussed in additional detail below.

At step 310, FS 110 transfers the user file for the user to SS 120 for storage in a personal cloud storage of the user.

The FS 110 initiates a transfer of the user file for the user to the file directory allocated on SS 120. The FS 110 may initiate transfer of the user file in response to detection of a trigger condition by FS 110. The trigger condition may be generation of the user file by FS 110, receipt of the user file at FS 110 from another device, a determination by FS 110 that the user is to be informed about availability of the user file, or the like. The initiation of transfer of the user file for the user to the file directory allocated by the user on SS 120 may include initiation of establishment of a connection with SS 120 via which FS 110 may transfer the user file to SS 120.

The FS 110 initiates establishment of a secure connection with SS 120. The FS 110 initiates establishment of a secure connection to the file directory allocated on SS 120. The secure connection may be based on SSL, HTTPS, FTPS, SFTP, HTTPS, or the like.

In at least some embodiments, SS 120 is configured to execute a challenge-response procedure in response to a request by an entity to access the file directory on SS 120 when the entity requesting to access the file directory is not using a typical authentication scheme (e.g., username and password) for accessing the file directory. Here, the requesting entity is FS 110. As noted above, FS 110 initiates establishment of a secure connection to the file directory allocated by the user on SS 120, which determines that the file directory is protected by a challenge-response process. The SS 120 sends to FS 110 a challenge requesting that FS 110 respond to the challenge by providing a property of the user that SS 120 may use to verify that FS 110 is authorized to access the file directory. The FS 110 receives the challenge from SS 120 and determines the property of the user that is requested by SS 120. The FS 110 sends a response to SS 120 that includes the property of the user that was requested by SS 120. The SS 120 then compares the property of the user that is received in the response from FS 110 with a corresponding property of the user that is determined by SS 120. If the values of the comparison match, SS 120 determines that FS 110 is authorized to access the file directory specified by the file directory name; otherwise, if the values of the comparison do not match, SS 120 determines that FS 110 is not authorized to access the file directory specified by the file directory name (in which case SS 120 may return an error message to FS 110 indicating that FS 110 is not authorized to access the file directory on SS 120). It will be appreciated that the property of the user that is determined by FS 110 in response to the challenge and determined by SS 120 for comparison with the response from FS 110 may be determined by FS 110 and SS 120 in a number of ways.

In at least some embodiments, for example, the property of the user is available to both FS 110 and SS 120. For example, the user may provide the same or similar sets of user specific information (including the same property of the user to be used for security purposes) to both the first service provider of FS 110 and the second service provider of SS 120. The property of the user may be stored on FS 110 and SS 120 or otherwise accessible to FS 110 and SS 120. The property of the user may be retrieved by FS 110 in response to the challenge from SS 120 and provided to SS 120 in the response, and the property of the user may be retrieved by SS 120 for comparison with the property of the user received from FS 110. The comparison performed by SS 120 may then proceed as discussed above.

In at least some embodiments, for example, as discussed above in conjunction with a description of properties of the file directory name, the property of the user is encoded within the file directory name. The SS 120 sends to FS 110 a challenge requesting the property of the user that is encoded within the file directory name. The FS 110 receives the challenge from SS 120 and applies its hash function to the file directory name in order to recover the property of the user from the file directory name. The FS 110 sends a response to SS 120 that includes the property of the user that was recovered by FS 110 from the file directory name. The SS 120 then applies its hash function to the encoded portion of the file directory name received from FS 110 in order to recover the property of the user from the file directory name. The comparison performed by SS 120 may then proceed as discussed above. It will be appreciated that the hash functions used by SS 120 (to recover the property of the user from the file directory name) and FS 110 (to decode the property of the user from the file directory name responsive to the challenge from SS 120) need to be the same in order for the challenge-response process to be successful. The hash function may be provided to SS 120 and FS 110 in any suitable manner. For example, the user may specify the same hash function during registration or account management functions performed by the user with the second service provider (for SS 120) and the first service provider (for FS 110). For example, the hash function used by SS 120 may be provided from SS 120 to FS 110, provided from FS 110 to SS 120, provided from one or more UDs 130 to SS 120 and FS 110, or the like (although it will be appreciated that the hash function typically should not be sent as part of any announcement message including the file directory name or any malicious entity that obtains access to such an announcement message could pretend to be FS 110 and gain access to the file directory on SS 120 using the file directory name and the hash function. It will be appreciated that use of a hash function to recover the property of the user may be useful in cases in which the user provides different sets of user specific information to the first service provider and the second service provider.

The FS 110 transfers the user file to SS 120 via the secure connection using the file directory allocated by the user on SS 120. The SS 120 receives the user file from FS 110 via the secure connection and stores the user file in the file directory allocated by the user on SS 120. Following transfer of the user file from FS 110 to the file directory on SS 120, the location and identity of the user file are known to both FS 110 and SS 120 and may be specified as a link. For example, given a file directory name of "hostname-of-serverSS120/path-name-to-user-file-incoming-directory", a file name of "user-file-name" and use of HTTPS as a secure protocol, the link to the file on SS 120 may be specified as "https://hostname-of-serverSS120/path-name-to-user-file-incoming-directory/user-file-name".

In at least some embodiments, one or more additional layers of security may be provided in conjunction with transfer of the user file by FS 110 to SS 120.

At step 320, availability of the user file for the user on SS 120 is announced to the user.

The announcement of the availability of the user file for the user on SS 120 may be provided via an announcement message sent by FS 110 or SS 120.

The announcement message may be sent as an email message to an email account of the user, a message to a mobile device of the user (e.g., an SMS message, an MMS message, or the like), an instant message to an instant message account of the user, or the like.

The announcement message that is sent to the user includes a link to the user file on SS 120 (which may or may not include the file directory name of the file directory allocated by the user on SS 120, depending on whether or not the user file is moved to a different storage location on SS 120 before the availability of the user file is announced to the user). The link may be included within the body of the announcement message, within an attachment included with the announcement message (e.g., in a MICROSOFT WORD document, in a PDF file, or the like), or the like. The link may be specified as a URL or using any other suitable mechanism for indicating the identity and location of the user file on SS 120. For example, the link may be specified as https://hostname-of-serverSS120/path-name-to-user-file-incoming-directory/user-file-name.

It will be appreciated that multiple such announcement messages may be sent by one or both of FS 110 and SS 120 using one or more types of media (e.g., the user may wish to be informed of availability of the user file via both email and text messages).

At step 330, at any time after transfer of the user file from FS 110 to SS 120, the user may access the user file from SS 120 using existing procedures by which the user accesses files from his or her personal cloud storage (e.g., using password-based authentication provided via a secure connection such as HTTPS). The accessing of the user file from SS 120 may or may not be responsive to receipt of announcement message, since the user still could access the user file from SS 120 regardless of whether the announcement was sent to or received by the user. The user also may manage the user file as may be done for any other files stored in the personal cloud storage of the user on SS 120 (e.g., actions such as examine, rename, download, transfer, delete, or the like). The user also may still access the user file from FS 110. In at least some embodiment, the user file may be encrypted on one or both of FS 110 and SS 120, such that anyone requesting to access the user file needs to provide a code (e.g., a PIN or some other information which may be used as a basis for protecting a file with encryption) in order to decrypt the user file.

In at least some embodiments of the Zero-Click File Transfer capability, security of the transfer of the user file from FS 110 to SS 120 may be provided based on at least one of: (1) encryption of the user file with a code having the following two components: a first code part which varies across user files and is provided to the user in the announcement message notifying the user of the availability of the user file on SS 120, and a second code part composed of or including a property of the user known to the user and FS 110 (e.g., the zip code of the billing address of the user that is on file with the service providers of FS 110, the last four digits of the SSN of the user, a portion of a telephone number of the user that has been provided to the service provider associated with FS 110 as a contact number for the user, a PIN composed of a set of characters specified for the user, or the like) and (2) encoding, within the file name of the user file, a property of the user that is known to FS 110 and SS 120 (e.g., the zip code of the billing address of the user that is on file with the service providers of FS 110 and SS 120, the last four digits of the SSN of the user, a portion of a telephone number of the user that has been provided to the service providers of FS 110 and SS 120 as a contact number for the user, a PIN composed of a set of characters specified for the user, or the like). With property (1) discussed above, the user file on SS 120 may only be decrypted by a user who knows both the first code part and the second code part, thereby reducing the chance for a malicious user to be able to access the user file from SS 120. With property (2) discussed above, SS 120 may be configured such that SS 120 is only able to keep a user file having a user file name that satisfies the encoding of property (2) discussed above and, thus, also is configured to delete files received from malicious servers not authorized to transfer files to SS 120 (and, thus, which would not be expected to encode the file names of the user files in accordance with the encoding of property (2) discussed above).

In at least some embodiments of the One-Click File Transfer capability or the Zero-Click File Transfer capability, one or more additional restrictions may be placed on the transfer of user files from FS 110 to SS 120. In various embodiments discussed above, FS 110 (and, potentially, one or more other servers of one or more other service providers) stores the original user files and SS 120 serves as a consolidation server for user files of the user received from FS 110 (and, again, potentially one or more other servers of one or more other service providers). In general, it is expected that the user trusts any user files stored on FS 110. Additionally, assume that the user enters a service agreement with the service provider of FS 110 that specifies that certain user files stored on FS 110 (e.g., user files with sensitive user information) will not be transferred to any communication entities not authorized by the user. In order for the service provider of FS 110 to meet this service agreement, the service provider of FS 110 can benefit from various forms of restrictions that may be placed on transfers of user files out of FS 110 (e.g., to SS 120 as discussed herein, or to any other destination servers to which such user files may be transferred). For example, such file transfer restrictions may be in the form of one or more of geographical restrictions (e.g., some or all of the user files on FS 110 may only be transferred from FS 110 to servers located in specified geographic locations or to servers not located in specified geographic locations), IP address based restrictions (e.g., some or all of the user files on FS 110 may only be transferred from FS 110 to servers having specified IP addresses), or the like, as well as various combinations thereof.

It will be appreciated that, as discussed above, various embodiments of the One-Click File Transfer capability and the Zero-Click File Transfer capability provide various advantages for both the user as well as various service providers involved in network-based storage of user files. For example, advantages for the user may include one or more of supporting direct transfer of a user file between network-based storage locations with minimal (e.g., for One-Click) or no (e.g., for Zero-Click) action by the user (thereby simplifying management of user files where network-based storage of the user files is used), supporting secure file transfers (e.g., via authentication schemes, challenge-response based authentication, encryption, and other security mechanisms which may be used to ensure data integrity), ensuring the integrity of the independent sets of authentication information maintained for the user by different network-based storage providers (e.g., the authentication information of the user on FS 110 does not need to be revealed to SS 120 and, vice versa, the authentication information of the user on SS 120 does not need to be revealed to FS 110), reducing transfer time and effort for transfers of user files between network-based storage locations, lowering costs (e.g., lowering data usage costs of the user that would otherwise have been incurred via downloading of the user file from FS 110 to UD 130 and then uploading of the user file from UD 130 to SS 120), and the like. For example, advantages for service providers may include one or more of reducing network resource consumption of communication service providers, increasing revenue of personal cloud storage service providers, and the like. Various other advantages are contemplated.

It will be appreciated that, although primarily depicted and described herein with respect to embodiments in which the link is expressed in a clickable form, in at least some embodiments the link may be expressed in a different form in which selection or activation of the link is performed by an action other than clicking. For example, the link may be represented as a quick response (QR) code such that selection or activation of the link is performed by using a camera to read the QR code. Thus, although primarily depicted and described herein using the terms One-Click and Zero-Click, it will be appreciated that, since the link may be selected or activated in other ways, references herein to One-Click and Zero-Click may be read more generally as references to One-Select and Zero-Select, One-Action and Zero-Action, or the like.

It will be appreciated that, although primarily depicted and described herein with respect to use of embodiments of the secure file transfer capability to securely transfer a file of a user to a personal network storage of the user, various embodiments of the secure file transfer capability may be used to securely transfer a file of an entity to a private network storage of the entity, where the entity may be a user, a group of users, a corporation, an organization, a device, or the like.

Figure 4:
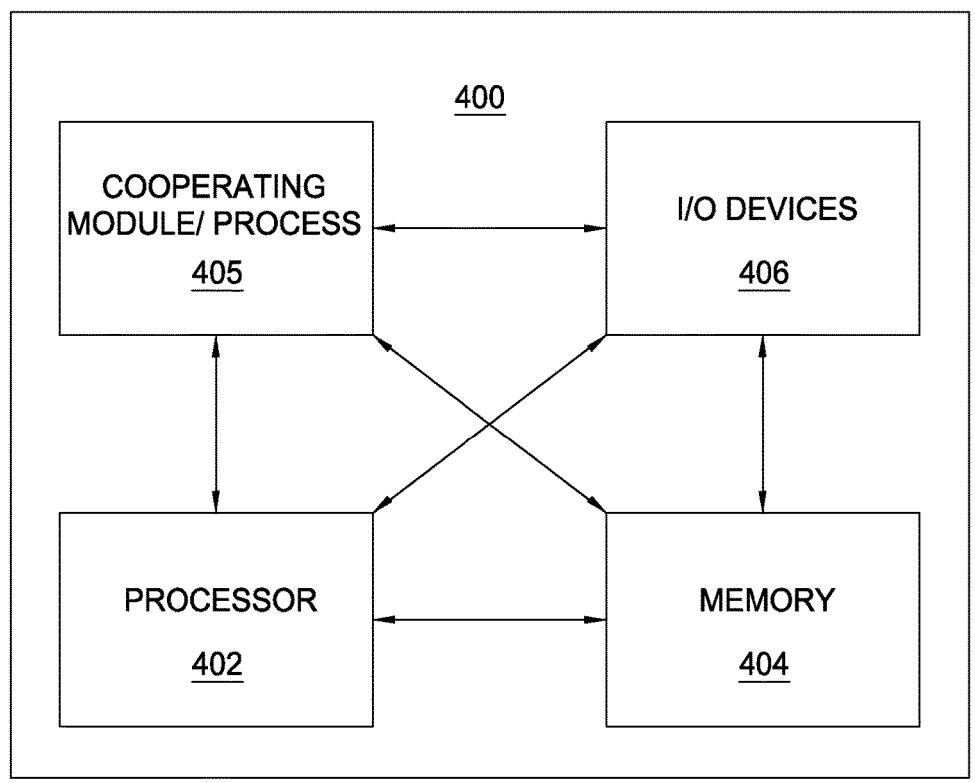
FIG. 4 depicts a high-level block diagram of a computer suitable for use in performing functions described herein.

FIG. 4 depicts a high-level block diagram of a computer suitable for use in performing functions described herein.

The computer 400 includes a processor 402 (e.g., a central processing unit (CPU) and/or other suitable processor(s)) and a memory 404 (e.g., random access memory (RAM), read only memory (ROM), and the like).

The computer 400 also may include a cooperating module/process 405. The cooperating process 405 can be loaded into memory 404 and executed by the processor 402 to implement functions as discussed herein and, thus, cooperating process 405 (including associated data structures) can be stored on a computer readable storage medium, e.g., RAM memory, magnetic or optical drive or diskette, and the like.

The computer 400 also may include one or more input/output devices 406 (e.g., a user input device (such as a keyboard, a keypad, a mouse, and the like), a user output device (such as a display, a speaker, and the like), an input port, an output port, a receiver, a transmitter, one or more storage devices (e.g., a tape drive, a floppy drive, a hard disk drive, a compact disk drive, and the like), or the like, as well as various combinations thereof).

It will be appreciated that computer 400 depicted in FIG. 4 provides a general architecture and functionality suitable for implementing functional elements described herein and/or portions of functional elements described herein. For example, computer 400 provides a general architecture and functionality suitable for implementing one or more of FS 110, a portion of FS 110, SS 120, a portion of SS 120, a UD 130, a portion of a UD 130, an element of CN 140, a portion of an element of CN 140, or any other device or combination of devices depicted and described herein.

It will be appreciated that the functions depicted and described herein may be implemented in software (e.g., via implementation of software on one or more processors, for executing on a general purpose computer (e.g., via execution by one or more processors) so as to implement a special purpose computer, and the like) and/or may be implemented in hardware (e.g., using a general purpose computer, one or more application specific integrated circuits (ASIC), and/or any other hardware equivalents).

It will be appreciated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal bearing medium, and/or stored within a memory within a computing device operating according to the instructions.

It will be appreciated that the term "or" as used herein refers to a non-exclusive "or," unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. A first server, comprising:
a processor and a memory communicatively connected to the processor, the processor configured to:
generate, by the first server, an announcement message including a link specifying a file location and a file name of a user file stored on the first server for a user, wherein the link has a property of the user encoded therein;
propagate, by the first server, the announcement message for delivery to the user;
receive, by the first server from a second server, a request to establish a secure connection between the first server and the second server;

receive, by the first server from the second server, a request for the user file stored on the first server for the user, wherein the request includes the link;

determine, by the first server based on receipt of the request for the user file from the second server, that the user file is protected by a challenge-response authentication process;

propagate, by the first server toward the second server, a challenge comprising a request for a challenge value associated with the user file;

receive, by the first server from the second server, a challenge response including the challenge value associated with the user file, wherein the challenge value associated with the user file comprises the property of the user;

determine, by the first server based on the link, a comparison value associated with the user file, wherein the comparison value associated with the user file comprises the property of the user; and propagate the user file from the first server toward the second server via the secure connection based on a determination that the challenge value and the comparison value match.

2. The first server of claim 1, wherein the processor is configured to generate the announcement message based on generation of the user file by the first server, receipt of the user file at the first server, or a determination that availability of the user file is to be announced to the user.

3. The first server of claim 1, wherein the announcement message comprises at least one of an email message to an email account of the user, a message to a mobile device of the user, an instant message, or a quick response (QR) code.

4. The first server of claim 1, wherein the processor is configured to:
generate the link specifying the file location and the file name of the user file.

5. The first server of claim 4, wherein, to generate the link specifying the file location and the file name of the user file, the processor is configured to perform at least one of:
generate the link to have a length greater than a threshold; embed pre-determined text within the link; or
encode the property of the user within at least one of a path-name-to-user-file portion of the link or a user-file-name portion of the link.

6. The first server of claim 1, wherein the processor is configured to determine the comparison value by at least one of:
retrieving the comparison value from the link; or
decoding the comparison value from the link based on application of a hash function to at least a portion of the link.

7. The first server of claim 1, wherein the processor is configured to:
encrypt the user file based on a code comprising a first code part and a second code part, wherein the announcement message includes the first code part, wherein the second code part comprises a property that is associated with the user and that is known to the first server.

8. A user device, comprising:
a processor and a memory communicatively connected to the processor, the processor configured to:
receive, by the user device from a first server, an announcement message including a link specifying a file location and a file name of a user file stored on the first server for a user, wherein the link includes a property of the user;

determine, by the user device based on at least one characteristic of the link, whether the link is associated with a file transfer process for triggering transfer of the file from the first server to a second server; and propagate the link from the user device toward the second server based on a determination that the link is associated with the file transfer process for triggering transfer of the file from the first server to the second server.

9. The user device of claim 8, wherein the property of the user comprises at least one of a zip code of a billing address of the user, a portion of a Social Security Number (SSN) of the user, a portion of a telephone number of the user, or a pin of the user.

10. The user device of claim 8, wherein the at least one characteristics of the link comprises the property of the user being included as predefined text within the link or the property of the user being encoded within the link.

11. The user device of claim 8, wherein the at least one characteristic of the link comprises at least one of an inclusion of predefined text within the link or an encoding of information within the link.

12. The user device of claim 8, wherein the processor is configured to:
propagate, from the user device toward the first server prior to receiving the announcement message from the first server, the property of the user.

13. The user device of claim 8, wherein, to propagate the link toward the second server, the processor is configured to:
initiate establishment of a secure connection with the second server; and
propagate the link toward the second server via the secure connection.

14. The user device of claim 8, wherein the processor is configured to:
receive, by the user device from the second server, the user file.

15. The user device of claim 8, wherein the user file is encrypted based on a code comprising a first code part and a second code part, wherein the announcement message includes the first code part.

16. The user device of claim 8, wherein the processor is configured to:
send, from the user device toward the second server, information to enable the second server to recover the property of the user from the link for use as a challenge response to obtain the user file from the first server.

17. A first server, comprising:
a processor and a memory communicatively connected to the processor, the processor configured to:
receive, by the first server from a user device of a user, a message including a link specifying a file location and a file name of a user file stored on a second server for the user, wherein the link includes a property of the user;

initiate, by the first server responsive to the message from the user device and based on the link included within the message from the user device, establishment of a secure connection between the first server and the second server;

propagate, from the first server toward the second server based on the link, a request for the user file;

receive, by the first server from the second server, a challenge comprising a request for a challenge value associated with the user file;

propagate, by the first server toward the second server, a challenge response including the challenge value associated with the user file, wherein the challenge value associated with the user file comprises the property of the user;

receive, by the first server from the second server via the secure connection, the user file;

store, by the first server, the user file;

receive, by the first server from the user device of the user or from a second user device of the user, a request to access the user file; and propagate the user file from the first server toward the user device of the user or toward the second user device of the user.

18. The first server of claim 17, wherein the processor is configured to:

receive, from the user device, a request to establish a secure connection with the user device; and receive the message including the link via the secure connection with the user device.

19. The first server of claim 17, wherein the processor is configured to determine the challenge value by at least one of:

retrieving the property of the user from the link; or decoding the property of the user from the link based on application of a hash function to at least a portion of the link.

20. The first server of claim 17, wherein the file name has a property encoded therein, wherein the processor is configured to:

determine, by the first server based on the property, whether the second server is authorized to transfer the user file to the first server.

* * * * *